(No Model.) 3 Sheets—Sheet 3.
E. THOMSON.
ELECTRIC METER.
No. 406,010. Patented June 25, 1889.
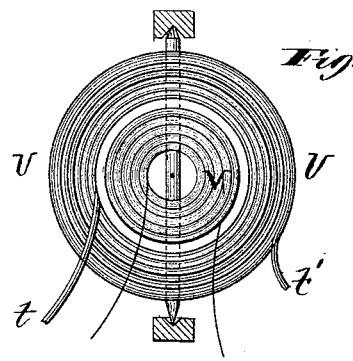
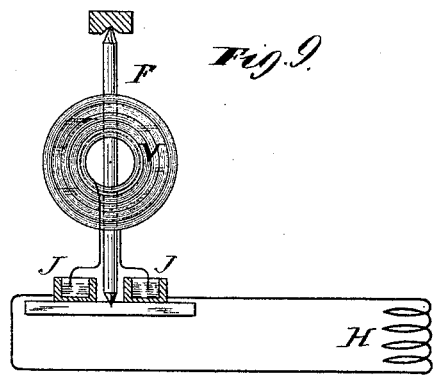
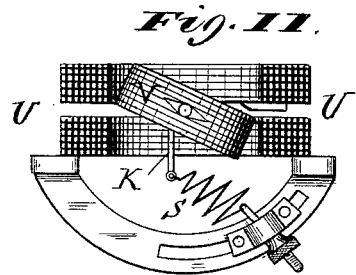
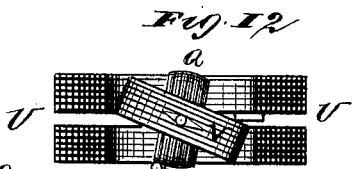
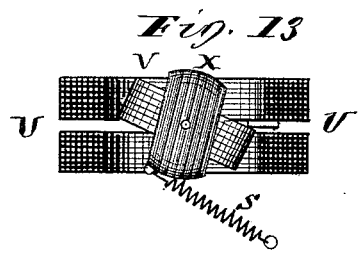
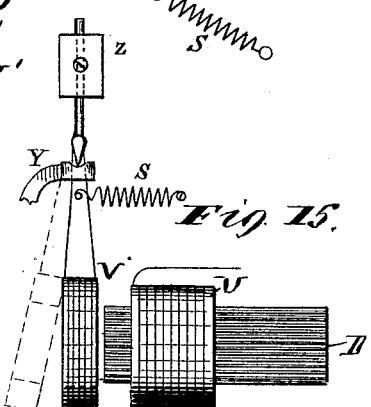
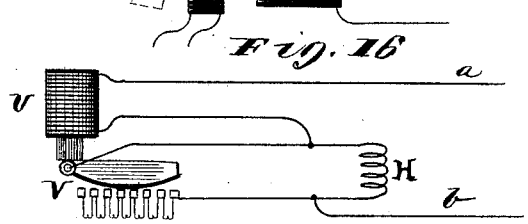
WITNESSES:
Gabriel J. W. Galster
Wm H Capel
INVENTOR
Elihu Thomson
BY
Townsend MacArthur
ATTORNEY

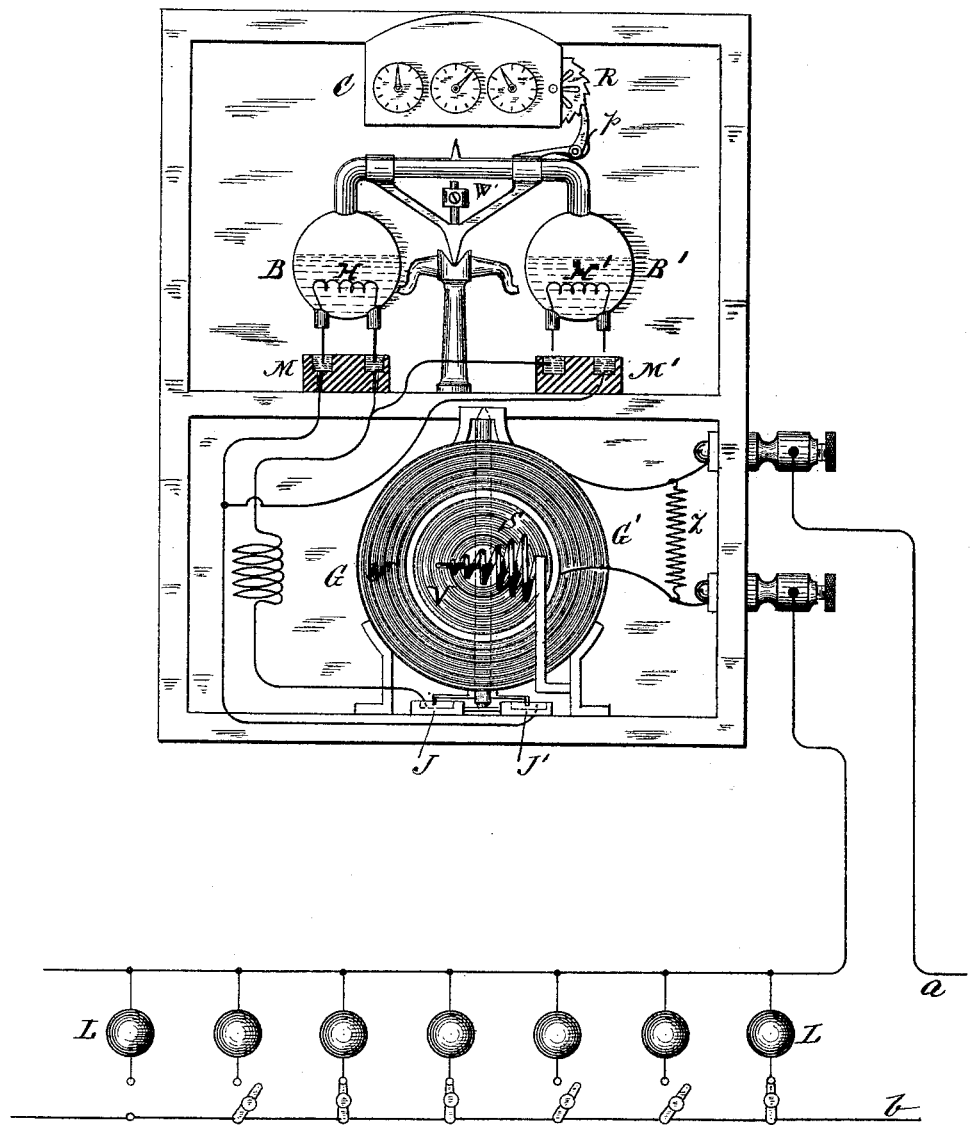

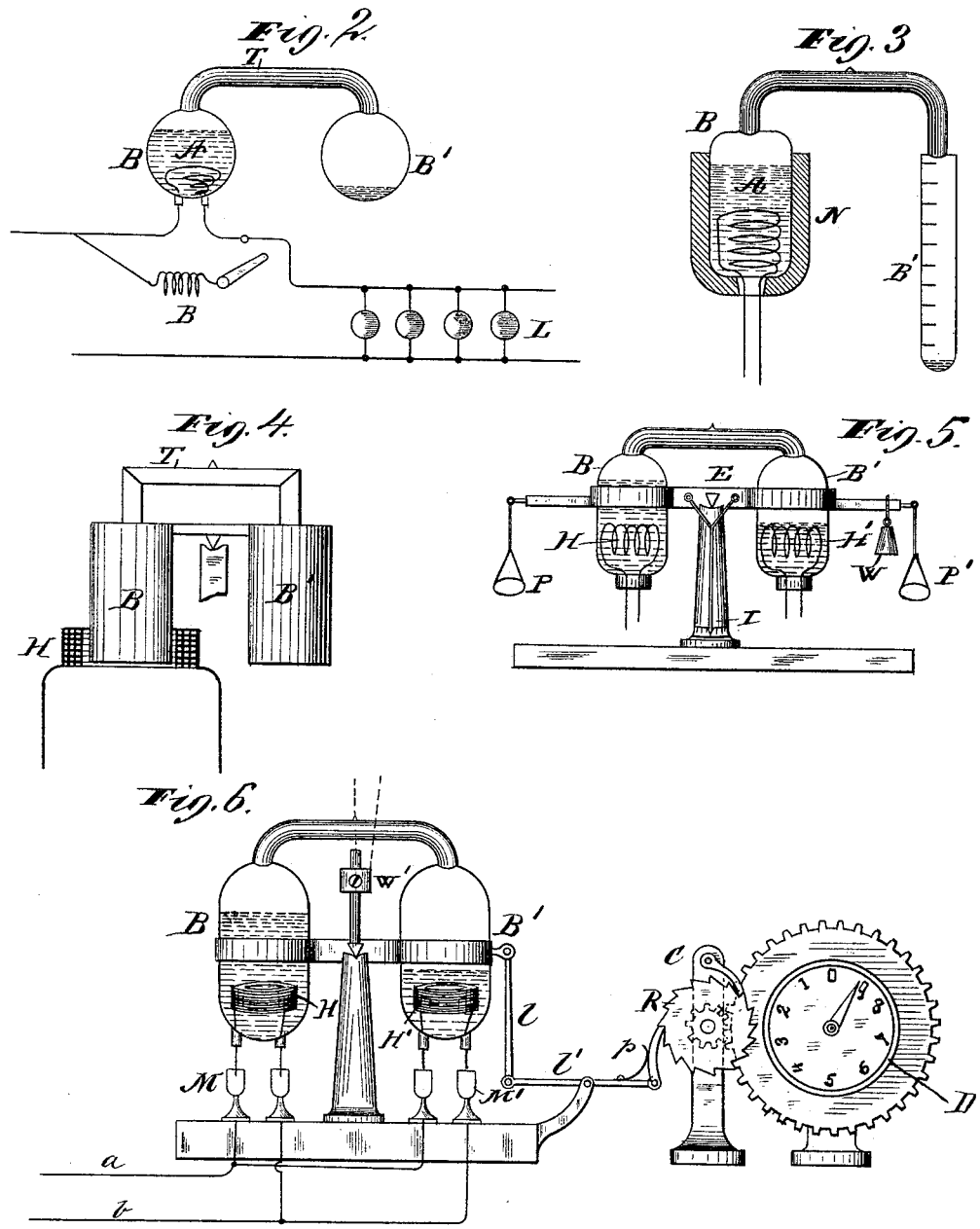

UNITED STATES PATENT OFFICE

ELIHU THOMSON, OF LYNN, MASSACHUSETTS.

ELECTRIC METER.

SPECIFICATION forming part of Letters Patent No. 406,010, dated June 25, 1889.

Application filed October 19, 1887. Serial No. 252,793. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

My invention relates to devices and combinations of devices whereby electric currents may be measured or indicated by the heating effect of electricity.

The object of the invention is, particularly, to provide a simple and effective meter suitable for use with alternating currents. Some of the devices forming my invention are, however, applicable to other purposes, and in some forms the invention may be readily used for measuring or indicating direct or straight currents.

My invention consists in the combination, with a liquid-containing receptacle holding a vaporizable liquid, of an electric conductor forming a portion of an electric circuit and adapted to heat said liquid, and a second chamber for collecting the condensed vapor evolved by the heating of the liquid by the electric conductor.

My invention consists, further, in the combination, with a receptacle, preferably closed and containing the liquid, preferably volatile, like alcohol, of a heating electric conductor, in the form of a coil or any other shape, placed in proximity to said receptacle, or within the same, and forming the path of an electric current, whereby heat may be developed in said conductor and the liquid may be evaporated or volatilized, for the purposes hereinafter described, and means for registering or indicating the amount of vaporization.

My invention consists, further, in the combination, with the receptacle and conductor, or with any other translating device in which the effects are as the square of the current, of a transformer whose two members are movable with relation to one another for causing the current to flow in the conductor in proportion not to the amount of current in the circuit where it is to be measured, but to the square root of the current passing on such circuit, as near as may be within the limits of mechanical errors. Thus, for instance, if the translating device were responsive to the heat evolved by the electric current and were used for measuring the number of incandescent lamps in use, the governing device would cause current to flow in the translating device in amount not proportional to the number of standard lamps in use or to the current used on the lamps, but proportional to the square root of the number of standard lamps, or to the square root of the current passing in the lamps used at any one time.

My invention consists, further, in certain devices and combinations of devices adapted for use with an electric meter, which devices and combinations of devices will be described in connection with the accompanying drawings, and then more particularly specified in the claims.

In the accompanying drawings, Figure 1 is an elevation of an apparatus in which my invention is embodied for the purpose of measuring the current supplied to a group of incandescent electric lamps, and in which suitable compensation in accordance with my invention is made for the error which would be due to the fact that the heating effect on the portion of the meter affected by the heat of the current is proportional, under the well-known law, to the square of the current. Figs. 2, 3, and 4 represent in partial section and elevation simple forms of my invention. Figs. 5 and 6 illustrate the application of the devices forming my invention to an electric meter. Fig. 7 shows another form of my invention. Figs. 8 and 9 show in elevation forms of compensating device or current-governor adapted for use in accordance with my invention. Fig. 10 shows in plan a part of the devices used for conveying current from said governor. Fig. 11 is a horizontal cross-section of the governor. Figs. 12, 13, 14, and 15 illustrate in cross-section and elevation other forms of current governor or compensator in which electrical or magnetic induction is applied. Fig. 16 shows in side elevation another form of current-governor adapted for use when my invention is employed on continuous-current circuits.

Fig. 1 shows at B B′ the first part of my invention, consisting of the evaporation device with a register combined, as above stated, with a current-governor G G', forming another part of my invention. Further description of this figure will be deferred until the general principles and details of other figures have been given.

In Fig. 2, B and B' are bulbs of glass or other suitable material connected together by a tube or passage T. They are partly filled with alcohol or other like vaporizable fluid, which has been well boiled in the bulbs and sealed while vapor was escaping, so producing in the bulbs an alcohol vacuum or a space filled with alcohol-vapor at the tension due to its temperature, no air being present, or very little. In the bulb B is placed a small coil or other form of conductor, of German silver or other material, connected by wires sealed through the glass of the bulb B, with an electric current shown here as one leading to lamps L, so that the whole of, or a definite part of, the current fed to the lamps may traverse the coil in the bulb. When it is desired that a part only should flow, a shunt with resistance R is placed around the coil in the bulb. The coil in the bulb has a very low resistance comparatively to the lamps, and a very small amount of heat is developed in it when the lamps are burning. During such burning a continual evaporation of alcohol from B to B' and condensation in B' takes place. This evaporation I find to be nearly independent of outside temperatures within ordinary ranges, provided both bulbs are shielded from drafts of air or currents of air. The amount evaporated in B is of course as the square of the current in the coil, because the heating effect is as the square of the current, and is proportional to the time of flow.

Fig. 3 shows the bulb B clad in a non-conductor of heat N and B,' graduated so as to give readings of the amounts of liquid received by it.

In Fig. 4 the parts B B' are metal cases well soldered and connected by a tube T of metal soldered so as to be perfectly tight and non-leakable. The heating-coil H is outside B, and the structure B, B', and T is hung upon knife-edges, so that the amount of evaporation may be determined by the excess of weight found in B' after a given time. This balancing may be carried out as indicated in Fig. 5, where bulbs B B' of glass hermetically sealed after boiling of inclosed liquid are hung on knife-edge E, with index I, showing equilibrium, and with weights W and pans P P', for determining amount of disturbance by transfer of fluid. The heating-coils H H' are provided, so that either B or B' may be made the evaporator-bulb.

The parts of Fig. 5 are modified in Fig. 6, so that by means of an electric switch operated by said bulbs an automatic transfer of current takes place from coil H to H' and back again upon a given evaporation taking place from one or other bulb B B' to the other. To this end the center of gravity of the system is made, so that it shall always be at a higher point than produces stable equilibrium—that is, so that with an equal amount of weight in each bulb the structure will only rest in inclined positions at either side. To produce a definite amount of this "overbalancing" or "oversetting," as it is termed, a weight W' may be provided, sliding up and down on a vertical rod above the suspension edges and affixed in any desired position. As the bulbs tip from side to side, the wires extending from the bottom of each bulb alternately dip in their respective mercury-cups M M', so as to complete the circuit from $a$ $b$ through one or the other heating-coil H H', as the case may be. During passage of current from wire $a$ to wire $b$ the structure so constituted will intermittently tip back and forth. This oscillation can be given a definite value by providing suitable stops, limiting the play of the bulbs, and by giving the bulbs a definite oversetting. As a type of any registry mechanism counting or recording the movements of or otherwise actuated or affected to a definite degree by each swing of the bulbs B B', an ordinary ratchet-and-pawl counter is shown attached at C, so that each throw of the bulbs may be registered. Any other registering mechanism might take the place of C. The link $l$ connects to lever $l'$ and to pawl $p$, operating the ratchet-wheel R', geared to a counter-dial D.

Instead of having the liquid evaporated from one bulb to the other, as in Figs. 5 and 6, the device might be inverted, so that the evaporation in one bulb, Fig. 7, would drive the liquid through the tube to the other, and vice versa. This special arrangement is, however, claimed in my application for patent filed November 3, 1887, Serial No. 254,222.

While the devices of Figs. 2 to 6, inclusive, are complete in themselves and will evaporate fluid in proportion to the time of flow of current and in proportion to the square of the current, whether it be alternating or direct current, still for most of the purposes of my invention it should evaporate fluid in proportion, not to the square, but to the current itself. To secure this it is necessary to combine with it a device which shall make this correction, or which shall pass through the meter only such currents as will be in direct proportion to the square roots of the currents fed to the lamps, so that whether one lamp or a dozen be in use the record shall be true. To do this with a fair approximation in the use of alternating currents is simple, but is less easy in the case of direct currents. A suitable means for this purpose consists of any inductive device whose inductive action or effect automatically varies under the operation of the current to be measured. The device of my invention for alternating currents is shown in several modified forms in the succeeding figures.

In Fig. 8 U is a fixed coil or coils placed in the circuit with the lamps used by its terminals $t\ t'$. Mounted on a vertically-pivoted shaft delicately poised is a second coil V, or coils whose terminals are carried to the heating-coils H or H' of the preceding figures. The coil V is, however, capable of rotation on its vertical axis F, Fig. 9, mounted in suitable jewels, and to avoid friction its terminals dip in mercury-cups J J', Figs. 9 and 10, from which cups connection is made through the heating-coil H in the evaporating-bulb of Fig. 6, for instance. A suitable delicate spring S (shown in Fig. 11) adjustable as to its fixed extremity both in position and elasticity, is selected and attached to an arm K, extending, as shown, from the coil V or its supporting-axis. The spring S is wound conically, or thereabout, and is of very light wire, and is adjusted to pull in such direction, and its elastic force is made such that alternating currents in coils U will, when coil V is circuited through H, Fig. 9, cause deflection of V from the position shown in Fig. 11 to a position at which its plane approaches a right angle with that of coils U U, and at the same time that the current induced in coil V by those in coil U shall be as the square roots of said currents in U. This condition I find to be attainable with tolerable approximation to accuracy by suitably proportioning the restraining influences governing the motion of the coil V under the deflective actions exerted.

The coil V may, as in Fig. 12, have a small core or bundle of iron wire or sheet strips Q carried with it, and it will then require less elastic force of the springs S to be exerted upon it in its deflected positions, because the core Q will tend to return the coil V to restrain its deflection, for said core will tend to place itself axially with respect to coil U. The precaution must be taken to have the core Q quite short and rather small, as otherwise its effect in restraining deflection of V may be excessive.

Figs. 13 and 14 show another way of restraining the deflection of V, which consists in providing a closed band or circuit X, forming an angle with V, which angle may be made of varying amounts, as needed. If the plane of X be about forty-five degrees angle with that of V, or a little greater than this, it will suffice. The tendency of band X is to stand at right angles with the plane of coil U U, and it acts, therefore, in much the same sense as the core Q. Care must be taken, however, that closed band or conductor X be not too large or powerful in its effects. The object is to so adjust the parts and their relations of size and effect that the currents induced in coil V by currents in U U shall always be in proportion, so far as can readily be attained, to the square roots of the currents in U U. If the coil V did not become deflected the currents in it would be in direct proportion to those in U U. The deflection of V, however, causes the desired diminution.

While I have described the coil V as the movable one, it will be evident that the coils V and U are interchangeable in their relations, so far as movability of either is concerned. If the coil V be hung, as in Fig. 15, in front of a coil U and core D' affected by the lamp-current, the current in U will not induce currents in V proportional to those in U; but an approximation to the effects obtainable with Figs. 8 to 13 is possible. The suspension at Y must be delicate and at a considerable distance above the coil V. A counter-balance Z to coil V is used in this case. It exactly balances the weight of V on the support or fulcrum Y.

For direct currents the induction effects cannot be utilized; but for the purpose of a compensator or governor I employ a solenoid-coil U in circuit with the lamps, and a variable shunt V around the heating-coil H, which variable shunt is operated by the solenoid-core upon accessions of current in its coil V. The arrangement is so proportioned that increments of current in U will vary the shunt at V, or the resistance at V in shunt to H, in such way that H shall receive only the square roots of the currents in U. The variations are, however, not so smooth and delicate as they are with alternating currents in the devices before described.

Having now described the parts of my improved meter, it is only necessary to consider them as combined in Fig. 1. The counter C, or set of dials, is a well-known device for registering progressive movements. The bulbs B B' are arranged, as in Fig. 6, overset in balance and with automatic circuit-changers at M M'. The deflecting-coil V is connected therewith through J J', as in Fig. 9, and the coil V is inductively related to coil U and restrained by a suitable conical spring of few turns S, as in Fig. 11. The whole is inclosed in a box or case of which the front has been removed to show the parts. A variable resistance, or resistance whose amount can be set or varied, may be added as a shunt around the coil U to standardize the readings of the meter. The connections from $a$ to $b$, the supply-wires to the lamps L L, are shown. The apparatus so organized will register in proportion to lights used and to time of use, and constitutes a practical meter for circuits of constant potential but variable current.

I do not herein claim the method of measuring electricity, consisting in generating heat by the current and noting the amount of vaporization of a liquid heated thereby, as the method forms the subject of claims in another application filed May 27, 1889, Serial No. 312,213, forming a division of the present application.

I do not claim herein the method hereinbefore described of obtaining actions or effects in the meter or other translating device in direct proportion to the main current by admitting current to such device in proportion to the square roots of the currents flowing, as this method forms the subject of another application for patent filed by me.

What I claim as my invention is—

1. The combination, substantially as described, of a liquid-containing receptacle holding a vaporizable liquid, a heating-conductor forming a portion of an electric circuit, and a chamber or tube connected with the space above the liquid for collecting the condensed vapor evolved by the heating action of the current.

2. The combination, substantially as described, in an electric meter, of a receptacle containing a vaporizable liquid, a heating-conductor forming a portion of an electric circuit, and means for indicating or measuring the amount of vaporization.

3. The combination, substantially as described, of a liquid-containing receptacle holding a vaporizable liquid, an electric conductor forming a portion of an electric circuit and immersed in the liquid, and an independent condensing and collecting chamber connected with the space above the liquid, as and for the purpose described.

4. A balanced or pivoted liquid-containing receptacle holding a vaporizable liquid and having two liquid-holding chambers connected by a tube above the level of the liquid, in combination with a heating electric conductor.

5. A closed receptacle containing a vaporizable liquid, in combination with a heating electric conductor and an independent vapor condensing and collecting chamber connected with said vapor-space of said receptacle.

6. The combination, with a translating device operated by the heating effects of an electric current, of a transformer, the secondary of which is connected with the translating device, while the two members of the transformer are movable one with relation to the other under the action of the exciting-current.

7. The combination, with an electric meter, of a transformer whose two members are movable with relation to one another for the purpose of changing their inductive relations, one of the coils of said transformer being connected with the meter, while the other connects with the circuit of the current to be measured, as and for the purpose described.

8. The combination, in an electric meter, of a current-governing device operated or controlled by the current to be measured, a heating conductor or coil supplied with the current governed, a receptacle containing a volatile liquid acted upon by the heat developed in said conductor, and means for indicating the amount of vaporization of said liquid, as and for the purpose described.

9. The combination, with a closed receptacle containing a vaporizable liquid, of a heating electric conductor acting on the liquid, and a register or indicating device for showing the amount of liquid evaporated.

10. The combination, substantially as described, of two liquid-containing receptacles connected together and mounted upon a suitable pivot or fulcrum, two heating coils or conductors for said receptacles, and an electric switch operated by said pivoted receptacles, as and for the purpose described.

11. The combination, with a bulb or receptacle sealed and containing alcohol *in vacuo*, of a heating electric conductor, and a second bulb or receptacle connected to the first by a tube opening into the same above the level of the liquid.

12. The combination of an inducing and induced conductor movable with relation to one another under the influence of alternating currents and having a retractor adjusted as described, to permit the movable member to assume positions where the induced current will be proportional to the square root of the inducing-current, as and for the purpose described.

Signed at Lynn, in the county of Essex and State of Massachusetts, this 13th day of October, A. D. 1887.

ELIHU THOMSON.

Witnesses:
OTIS K. STUART,
J. W. GIBBONEY.